United States Patent
Kimura et al.

(10) Patent No.: US 7,097,437 B2
(45) Date of Patent: Aug. 29, 2006

(54) ROTARY FLUID MACHINE

(75) Inventors: Yasunari Kimura, Wako (JP);
Hiroyuki Niikura, Wako (JP);
Tsutomu Takahashi, Wako (JP);
Hiroshi Ichikawa, Wako (JP)

(73) Assignee: Honda Giken Kogyo Kabushiki Kaisha, Tokyo (JP)

( * ) Notice: Subject to any disclaimer, the term of this patent is extended or adjusted under 35 U.S.C. 154(b) by 147 days.

(21) Appl. No.: 10/489,919

(22) PCT Filed: Sep. 20, 2002

(86) PCT No.: PCT/JP02/09722

§ 371 (c)(1),
(2), (4) Date: Sep. 22, 2004

(87) PCT Pub. No.: WO03/027442

PCT Pub. Date: Apr. 3, 2003

(65) Prior Publication Data

US 2005/0031480 A1    Feb. 10, 2005

(30) Foreign Application Priority Data

Sep. 21, 2001 (JP) .............................. 2001-289394

(51) Int. Cl.
*F03C 2/00* (2006.01)
(52) U.S. Cl. ...................... 418/268; 418/144; 418/195; 91/494
(58) Field of Classification Search ................ 418/144, 418/195, 266–268; 91/491, 492, 494, 498
See application file for complete search history.

(56) References Cited

U.S. PATENT DOCUMENTS

| | | | | | |
|---|---|---|---|---|---|
| 3,585,904 | A | * | 6/1971 | White | 91/498 |
| 3,627,456 | A | * | 12/1971 | Gerlach | 418/268 |
| 4,518,069 | A | * | 5/1985 | Elias | 417/491 |
| 6,629,829 | B1 | * | 10/2003 | Shinoda et al. | 418/102 |

FOREIGN PATENT DOCUMENTS

| | | | |
|---|---|---|---|
| EP | 1 113 175 A1 | 7/2000 | |
| JP | 60-131690 U | 9/1985 | |
| JP | 8-200268 A | 8/1996 | |
| JP | 2000-320543 A | 11/2000 | |
| JP | 2003097207 A * | 4/2003 | 418/268 |
| WO | WO 00/53926 A1 | 3/2000 | |

* cited by examiner

*Primary Examiner*—Theresa Trieu
(74) *Attorney, Agent, or Firm*—Birch, Stewart, Kolasch, and Birch, LLP

(57) ABSTRACT

A rotary fluid machine is provided that includes a rotor chamber (14), a rotor (41), vanes (48) guided by vane channels formed in the rotor (41), and pistons (47) slidably fitted in cylinders (44) provided in the rotor (41). Rollers (71) provided on support shafts (48*d*) of the vane (48) are rollably engaged with annular channels (74) of a casing (11) so as to interconvert reciprocation of the pistons (47) and rotational movement of the rotor (41). By capturing water of a hydrostatic bearing, which supports the vane (48) in the vane channel in a floating state, by a U-shaped lubricating water guide channel (43*g*) formed on the end face of a rotor segment (43) and discharging it into the annular channels (74), the water is prevented from flowing into the rotor chamber (14) and decreasing the temperature of steam, thereby preventing the output of the rotary fluid machine from being degraded.

2 Claims, 13 Drawing Sheets

ROTARY FLUID MACHINE

FIELD OF THE INVENTION

The present invention relates to a rotary fluid machine for interconverting the pressure energy of a gas-phase working medium and the rotational energy of a rotor.

BACKGROUND ART

A rotary fluid machine disclosed in Japanese Patent Application Laid-open No. 2000-320543 is equipped with a vane piston unit in which a vane and a piston are combined; the piston, which is slidably fitted in a cylinder provided radially in a rotor, interconverts the pressure energy of a gas-phase working medium and the rotational energy of the rotor via a power conversion device comprising an annular channel and a roller, and the vane, which is radially and slidably supported in the rotor, interconverts the pressure energy of the gas-phase working medium and the rotational energy of the rotor.

The vane of such a rotary fluid machine is slidably supported in a vane channel formed radially in the rotor, and by supplying a high pressure liquid-phase working medium to sliding surfaces thereof so as to form a hydrostatic bearing, the vane is floatingly supported, thus greatly reducing the sliding resistance. However, if the liquid-phase working medium, which is used for the hydrostatic bearing and is supplied between the vane and the vane channel, flows into a vane chamber defined by the rotor, the casing, and the vanes, a high temperature gas-phase working medium within the vane chamber is cooled by the low temperature liquid-phase working medium for the hydrostatic bearing, thus giving rise to the problem that the rotary fluid machine cannot exhibit its full performance.

DISCLOSURE OF THE INVENTION

The present invention has been achieved under the above-mentioned circumstances, and an object thereof is to prevent a liquid-phase working medium that is used for a hydrostatic bearing and is supplied between a vane and a vane channel from flowing into a vane chamber.

In order to achieve the above object, in accordance with a first aspect of the present invention, there is proposed a rotary fluid machine that includes a rotor chamber formed in a casing, a rotor rotatably housed within the rotor chamber, a plurality of vane channels formed radially in the rotor, and a plurality of vanes slidably supported in the respective vane channels, the vanes being supported in a floating state by a hydrostatic bearing formed by supplying a liquid-phase working medium to sliding surfaces of the vane channels and the vanes, and the rotary fluid machine interconverting the rotational energy of the rotor and the pressure energy of a gas-phase working medium supplied to vane chambers defined by the rotor, the casing, and the vanes, wherein a liquid-phase working medium guide channel is formed in the vane channels of the rotor so as to surround a part of the hydrostatic bearing, and the liquid-phase working medium supplied to the hydrostatic bearing is captured by the liquid-phase working medium guide channel so as to prevent the liquid-phase working medium from flowing into the vane chambers.

In accordance with this arrangement, with regard to the rotary fluid machine in which the vane is supported in a floating state by the hydrostatic bearing formed by supplying the liquid-phase working medium to the sliding surfaces of the vanes and the vane channels of the rotor, since the liquid-phase working medium guide channel is formed in the vane channels so as to surround a part of the hydrostatic bearing, the liquid-phase working medium supplied to the hydrostatic bearing can be prevented from flowing into the vane chambers by the liquid-phase working medium guide channel capturing the liquid-phase working medium, thereby preventing the gas-phase working medium within the vane chambers from being cooled by the liquid-phase working medium and the performance of the rotary fluid machine from being degraded.

Furthermore, in accordance with a second aspect of the present invention, in addition to the first aspect, there is proposed a rotary fluid machine wherein an end portion of the liquid-phase working medium guide channel opens within a space other than the vane chambers.

In accordance with this arrangement, since the end portion of the liquid-phase working medium guide channel opens within the space other than the vane chambers, the liquid-phase working medium captured by the liquid-phase working medium guide channel can be more reliably prevented from flowing into the vane chamber.

A lubricating water guide channel 43g of an embodiment corresponds to the liquid-phase working medium guide channel of the present invention, and steam and water of the embodiment correspond to the gas-phase working medium and the liquid-phase working medium respectively of the present invention.

BRIEF DESCRIPTION OF THE DRAWINGS

FIG. 1 is a schematic view of a waste heat recovery system of an internal combustion engine;

FIG. 2 is a longitudinal sectional view of an expander, corresponding a sectional view along line 2—2 of FIG. 4;

FIG. 3 is an enlarged sectional view around the axis of FIG. 2;

FIG. 4 is a sectional view along line 4—4 of FIG. 2;

FIG. 5 is a sectional view along line 5—5 of FIG. 2;

FIG. 6 is a sectional view along line 6—6 of FIG. 2;

FIG. 7 is a sectional view along line 7—7 of FIG. 5;

FIG. 8 is a sectional view along line 8—8 of FIG. 5;

FIG. 9 is a sectional view along line 9—9 of FIG. 8;

FIG. 10 is a sectional view along line 10—10 of FIG. 3;

FIG. 11 is an exploded perspective view of a rotor;

FIG. 12 is an exploded perspective view of a lubricating water distribution section of the rotor; and FIG. 13 is a schematic view showing cross-sectional shapes of a rotor chamber and the rotor.

BEST MODE FOR CARRYING OUT THE INVENTION

An embodiment of the present invention is explained below with reference to FIG. 1 to FIG. 13.

Figure 1:
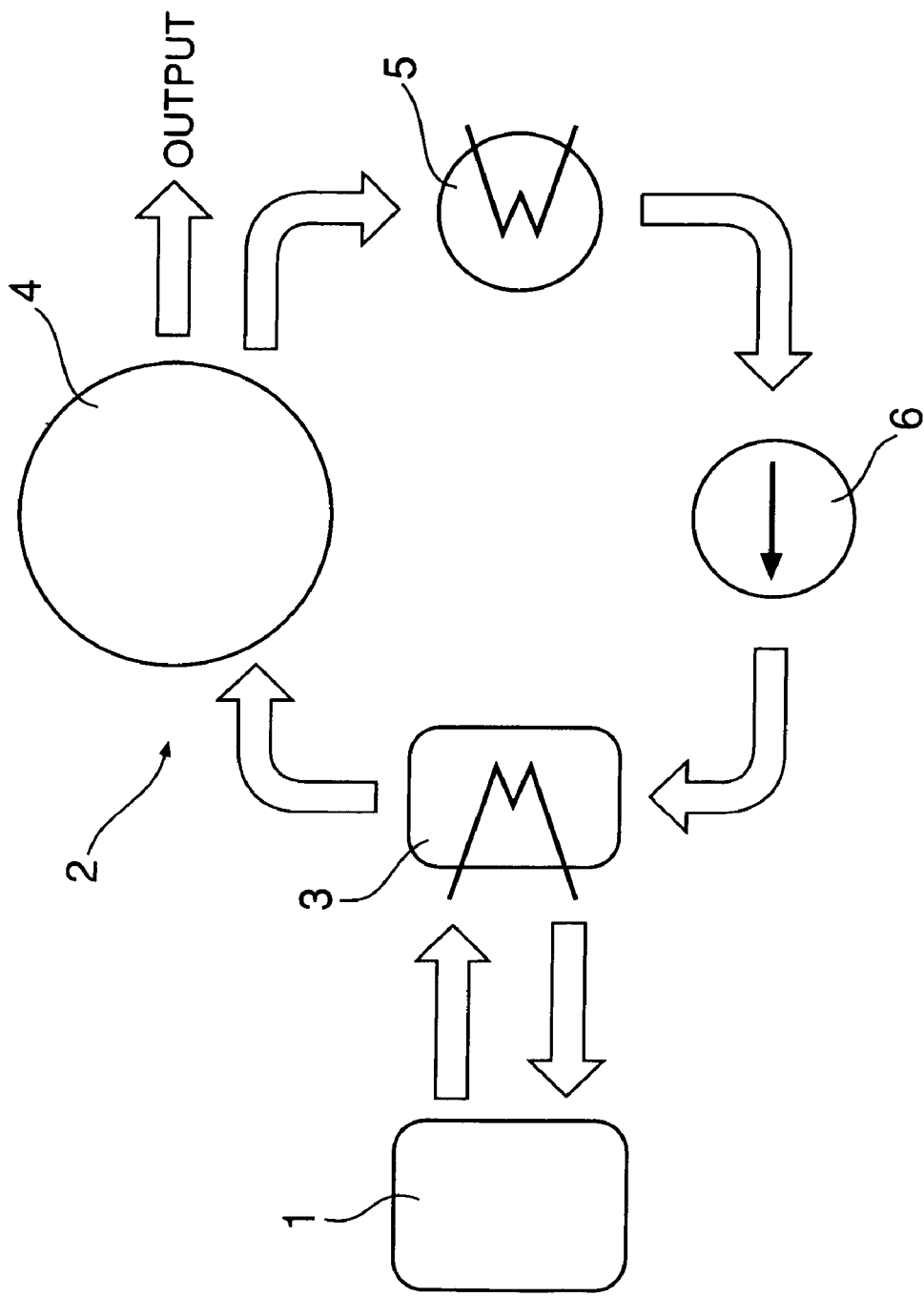
FIG. 1 to FIG. 13 illustrate one embodiment of the present invention.

In FIG. 1, a waste heat recovery system 2 for an internal combustion engine 1 includes an evaporator 3 that generates high temperature, high pressure steam by vaporizing a high pressure liquid (e.g. water) using as a heat source the waste heat (e.g. exhaust gas) of the internal combustion engine 1, an expander 4 that generates an output by expansion of the steam, a condenser 5 that liquefies steam having decreased temperature and pressure as a result of conversion of pressure energy into mechanical energy in the expander 4, and a supply pump 6 that pressurizes the liquid (e.g. water) from the condenser 5 and resupplies it to the evaporator 3.

Figure 2:
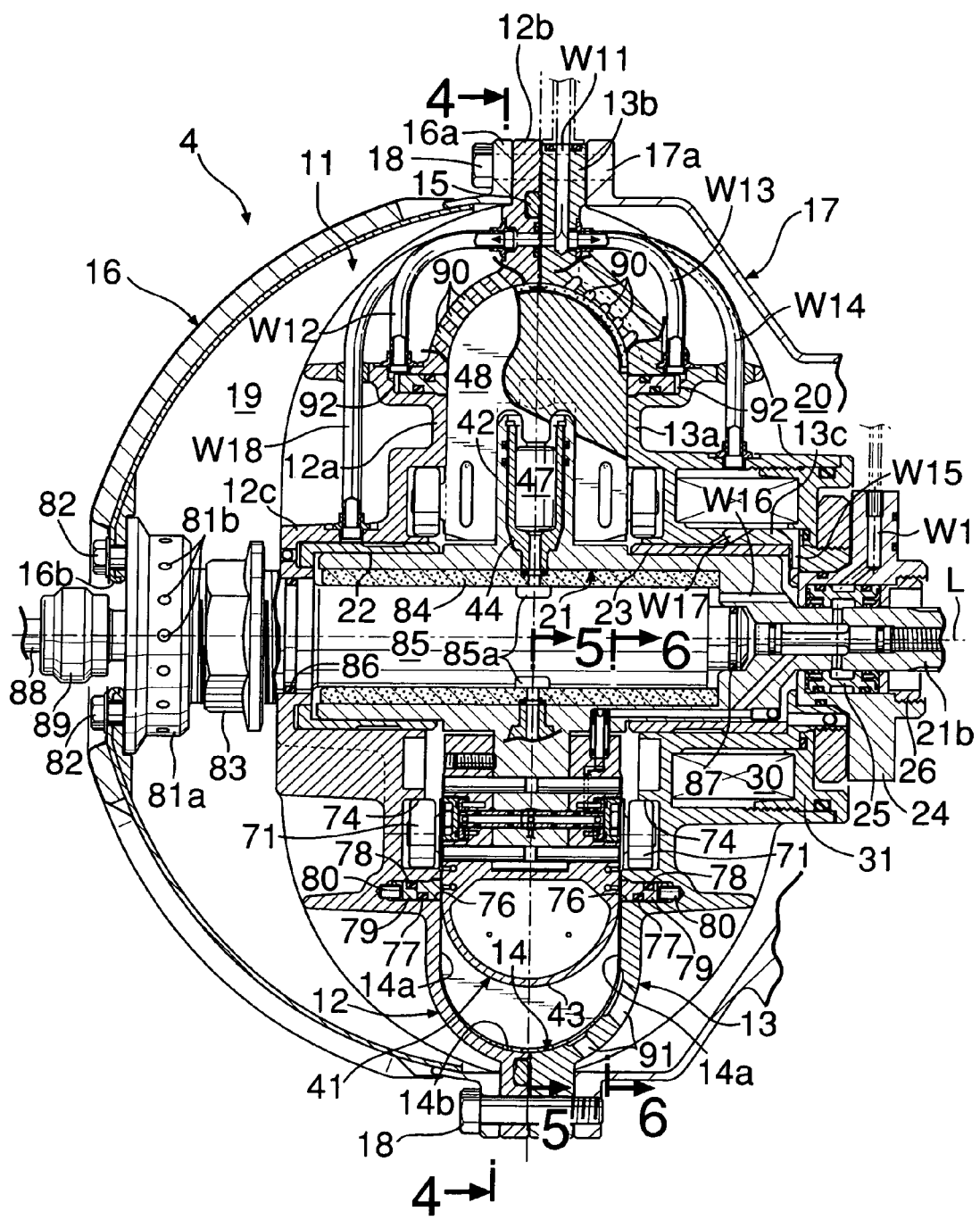
Figure 3:
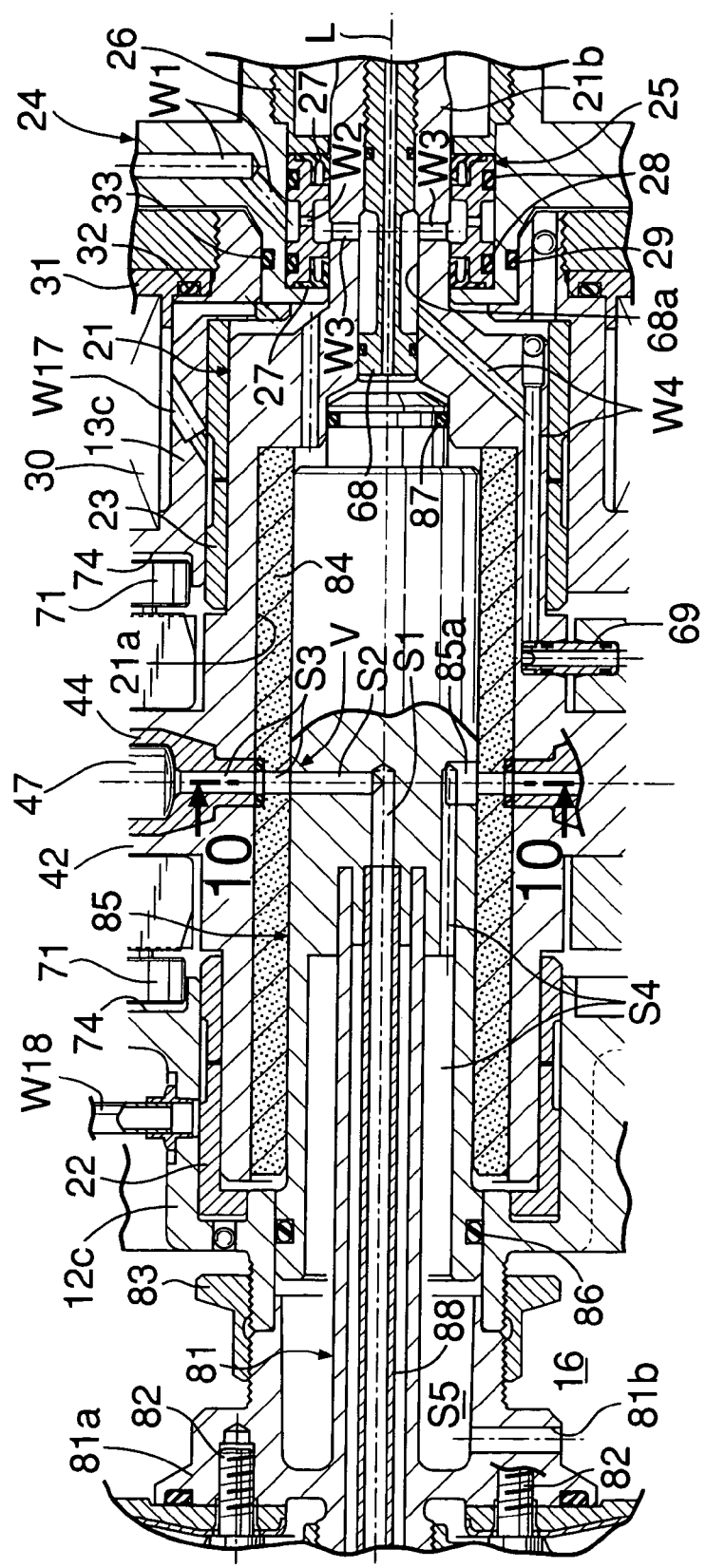

As shown in FIG. 2 and FIG. 3, a casing 11 of the expander 4 is formed from first and second casing halves 12 and 13, which are made of metal. The first and second casing halves 12 and 13 are formed from main body portions 12a and 13a, which in cooperation form a rotor chamber 14, and circular flanges 12b and 13b, which are joined integrally to the outer peripheries of the main body portions 12a and 13a, and the two circular flanges 12b and 13b are joined together via a metal gasket 15. The outer face of the first casing half 12 is covered with a transit chamber outer wall 16 having a deep bowl shape, and a circular flange 16a, which is joined integrally to the outer periphery of the transit chamber outer wall 16, is superimposed on the left face of the circular flange 12b of the first casing half 12. The outer face of the second casing half 13 is covered with an exhaust chamber outer wall 17 for housing a magnet coupling (not illustrated) for transmitting the output of the expander 4 to the outside, and a circular flange 17a, which is joined integrally to the outer periphery of the exhaust chamber outer wall 17, is superimposed on the right face of the circular flange 13b of the second casing half 13. The above-mentioned four circular flanges 12b, 13b, 16a, and 17a are tightened together by means of a plurality of bolts 18 disposed in the circumferential direction. A transit chamber 19 is defined between the transit chamber outer wall 16 and the first casing half 12, and an exhaust chamber 20 is defined between the exhaust chamber outer wall 17 and the second casing half 13. The exhaust chamber outer wall 17 is provided with an outlet (not illustrated) for guiding the decreased temperature, decreased pressure steam that has finished work in the expander 4 to the condenser 5.

The main body portions 12a and 13a of the two casing halves 12 and 13 have hollow bearing tubes 12c and 13c projecting outward in the lateral direction, and a rotating shaft 21 having a hollow portion 21a is rotatably supported by these hollow bearing tubes 12c and 13c via a pair of bearing members 22 and 23. The axis L of the rotating shaft 21 thus passes through the intersection of the major axis and the minor axis of the rotor chamber 14, which has a substantially elliptical shape.

A seal block 25 is housed within a lubricating water supply member 24 screwed onto the right-hand end of the second casing half 13, and secured by a nut 26. A small diameter portion 21b at the right-hand end of the rotating shaft 21 is supported within the seal block 25, a pair of seals 27 are disposed between the seal block 25 and the small diameter portion 21b, a pair of seals 28 are disposed between the seal block 25 and the lubricating water supply member 24, and a seal 29 is disposed between the lubricating water supply member 24 and the second casing half 13. A filter 30 is fitted in a recess formed in the outer periphery of the hollow bearing tube 13c of the second casing half 13, and is prevented from falling out by means of a filter cap 31 screwed into the second casing half 13. A pair of seals 32 and 33 are provided between the filter cap 31 and the second casing half 13.

Figure 4:
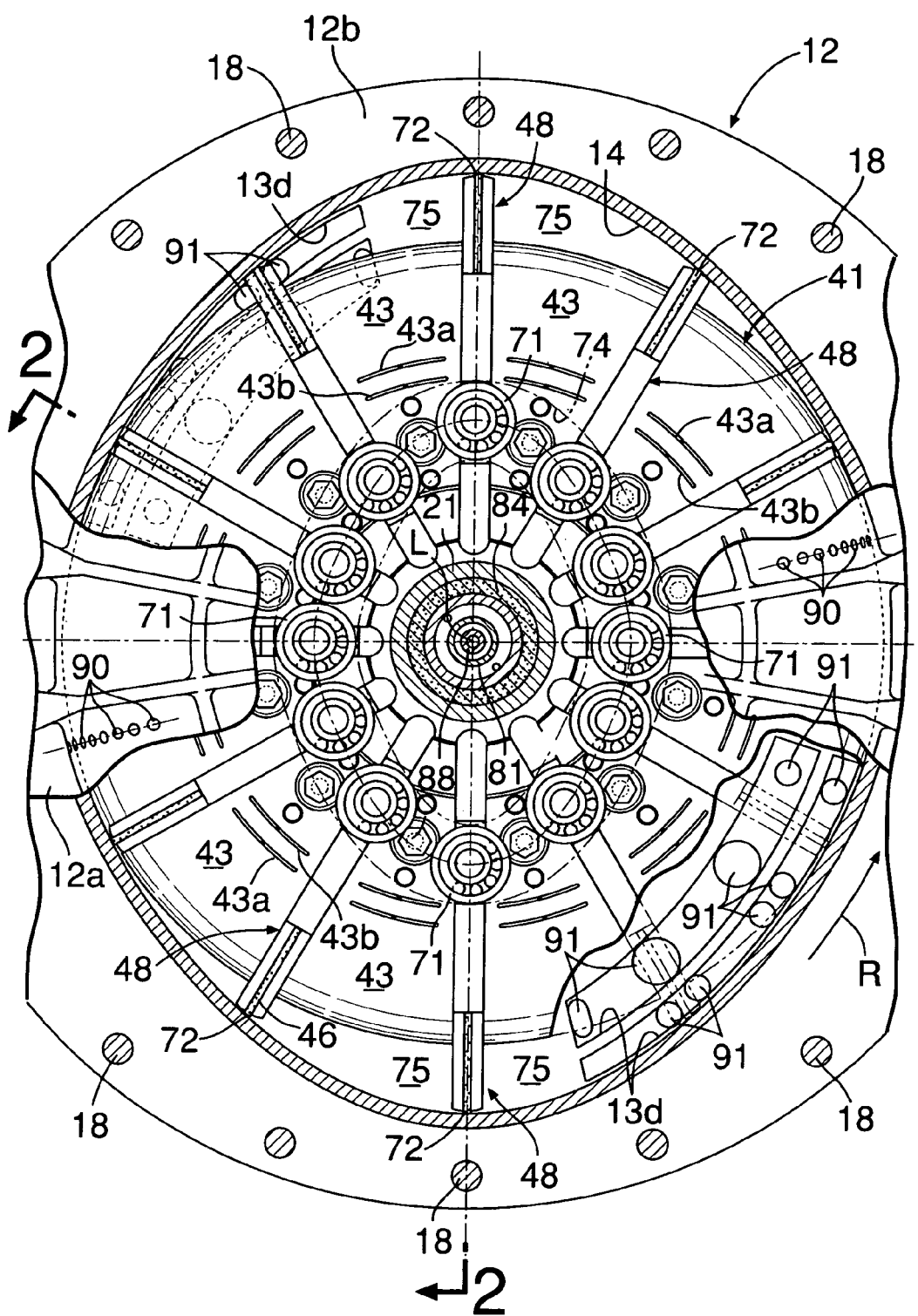
Figure 13:
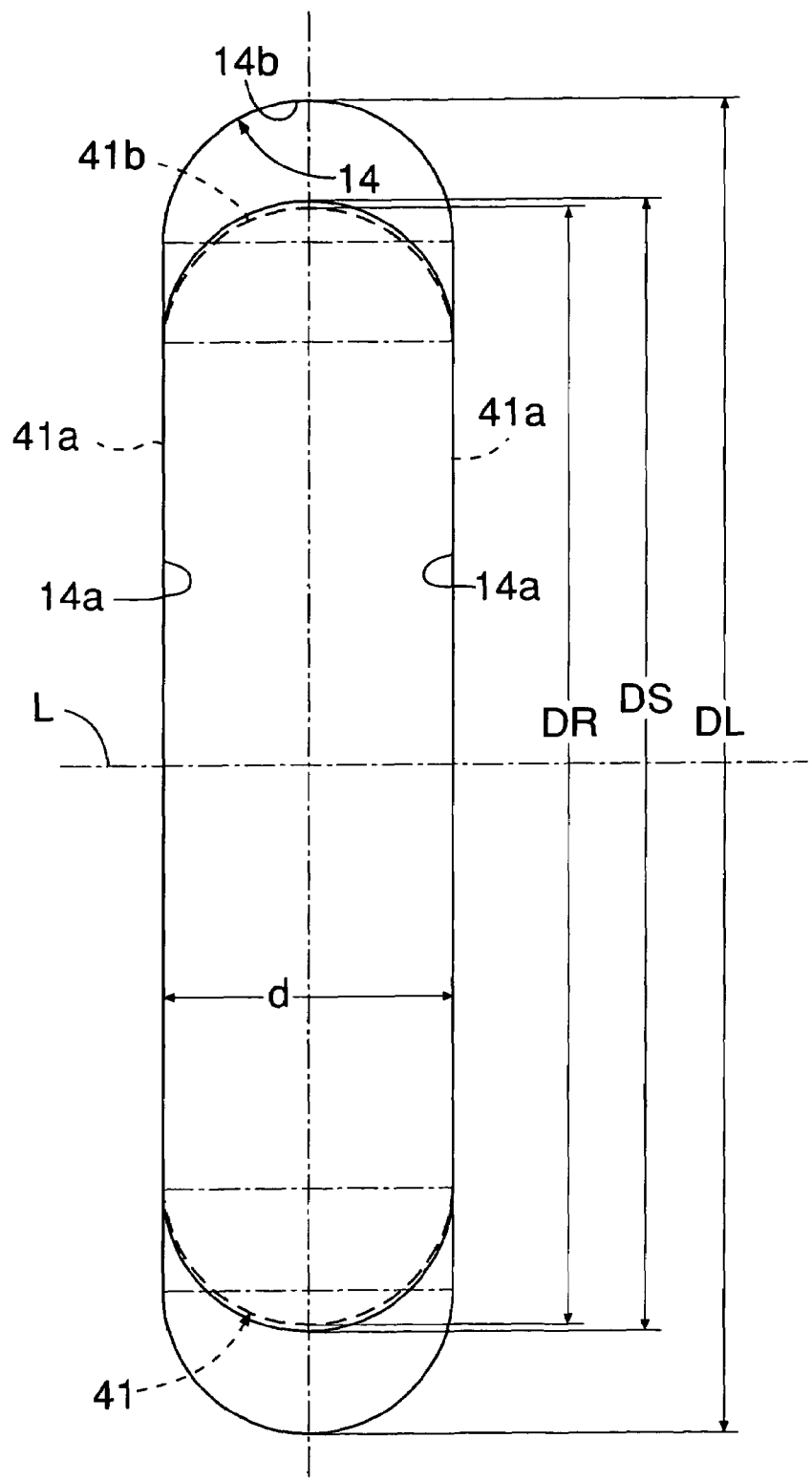

As is clear from FIG. 4 and FIG. 13, a circular rotor 41 is rotatably housed within the rotor chamber 14, which has a pseudo-elliptical shape. The rotor 41 is fitted onto and joined integrally to the outer periphery of the rotating shaft 21, and the axis of the rotor 41 and the axis of the rotor chamber 14 coincide with the axis L of the rotating shaft 21. The shape of the rotor chamber 14 viewed in the axis L direction is pseudo-elliptical, and is similar to a rhombus with its four apexes rounded, the shape having a major axis DL and a minor axis DS. The shape of the rotor 41 viewed in the axis L direction is a perfect circle having a diameter DR that is slightly smaller than the minor axis DS of the rotor chamber 14.

The cross-sectional shapes of the rotor chamber 14 and the rotor 41 viewed in a direction orthogonal to the axis L are all racetrack-shaped. That is, the cross-sectional shape of the rotor chamber 14 is formed from a pair of flat faces 14a extending parallel to each other at a distance d, and arc-shaped faces 14b having a central angle of 180° that are smoothly connected to the outer peripheries of the flat faces 14a and, similarly, the cross-sectional shape of the rotor 41 is formed from a pair of flat faces 41a extending parallel to each other at the distance d, and arc-shaped faces 41b having a central angle of 180° that are smoothly connected to the outer peripheries of the flat faces 41a. The flat faces 14a of the rotor chamber 14 and the flat faces 41a of the rotor 41 are in contact with each other, and a pair of crescent-shaped spaces are formed between the inner peripheral face of the rotor chamber 14 and the outer peripheral face of the rotor 41 (see FIG. 4).

The structure of the rotor 41 is now explained in detail with reference to FIG. 3 to FIG. 6, and FIG. 11.

The rotor 41 is formed from a rotor core 42 that is formed integrally with the outer periphery of the rotating shaft 21, and twelve rotor segments 43 that are fixed so as to cover the periphery of the rotor core 42 and form the outer shell of the rotor 41. Twelve ceramic (or carbon) cylinders 44 are mounted radially in the rotor core 42 at 30° intervals and fastened by means of clips 45 to prevent them falling out. A small diameter portion 44a is projectingly provided at the inner end of each of the cylinders 44, and a gap between the base end of the small diameter portion 44a and a sleeve 84 is sealed via a C seal 46. The extremity of the small diameter portion 44a is fitted into the outer peripheral face of the sleeve 84, which is hollow, and a cylinder bore 44b communicates with first and second steam passages S1 and S2 within the rotating shaft 21 via twelve third steam passages S3 running through the small diameter portion 44a and the rotating shaft 21. A ceramic piston 47 is slidably fitted within each of the cylinders 44. When the piston 47 moves to the radially innermost position, it retracts completely within the cylinder bore 44b, and when it moves to the radially outermost position, about half of the whole length projects outside the cylinder bore 44b.

Each of the rotor segments 43 is a hollow wedge-shaped member having a central angle of 30°, and has two recesses 43a and 43b formed on the faces thereof that are opposite the pair of flat faces 14a of the rotor chamber 14, the recesses 43a and 43b extending in an arc shape with the axis L as the center, and lubricating water outlets 43c and 43d open in the middle of the recesses 43a and 43b. Furthermore, four lubricating water outlets 43e and 43f open on the end faces of the rotor segments 43, that is, the faces that are opposite vanes 48, which will be described later. Furthermore, a U-shaped lubricating water guide channel 43g (see FIG. 7 and FIG. 11) is formed on the end face of the rotor segment 43 opposite the vane 48 so as to extend along the pair of flat faces 41a and the arc-shaped face 41b of the rotor 41. Opposite end portions of the lubricating water guide channel 43g communicate with annular channels 74, which will be described later, via a clearance between the flat faces 41a of the rotor 41 and the flat faces 14a of the rotor chamber 14.

The rotor 41 is assembled as follows. The twelve rotor segments 43 are fitted around the outer periphery of the rotor core 42, which is preassembled with the cylinders 44, the clips 45, and the C seals 46, and the vanes 48 are fitted in twelve vane channels 49 formed between adjacent rotor segments 43. At this point, in order to form a predetermined clearance between the vanes 48 and the rotor segments 43, shims having a predetermined thickness are disposed on opposite faces of the vanes 48. In this state, the rotor segments 43 and the vanes 48 are tightened inward in the radial direction toward the rotor core 42 by means of a jig so as to precisely position the rotor segments 43 relative to the rotor core 42, and each of the rotor segments 43 is then provisionally retained on the rotor core 42 by means of provisional retention bolts 50 (see FIG. 8). Subsequently each of the rotor segments 43 and the rotor core 42 are co-machined so as to make two knock pin holes 51 run therethrough, and four knock pins 52 are press-fitted in the two knock pin holes 51 so as to join each of the rotor segments 43 to the rotor core 42.

Figure 8:
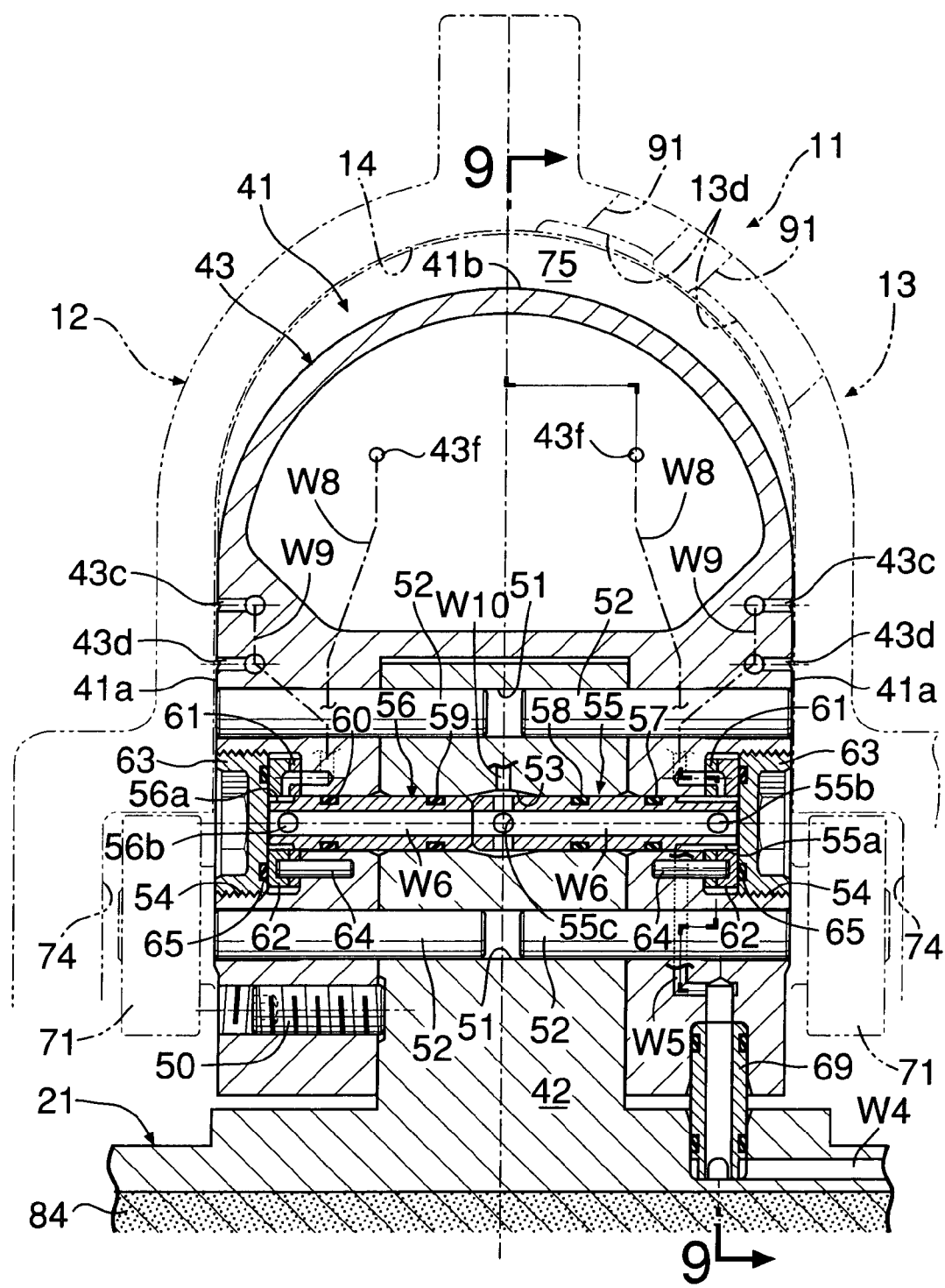
Figure 9:
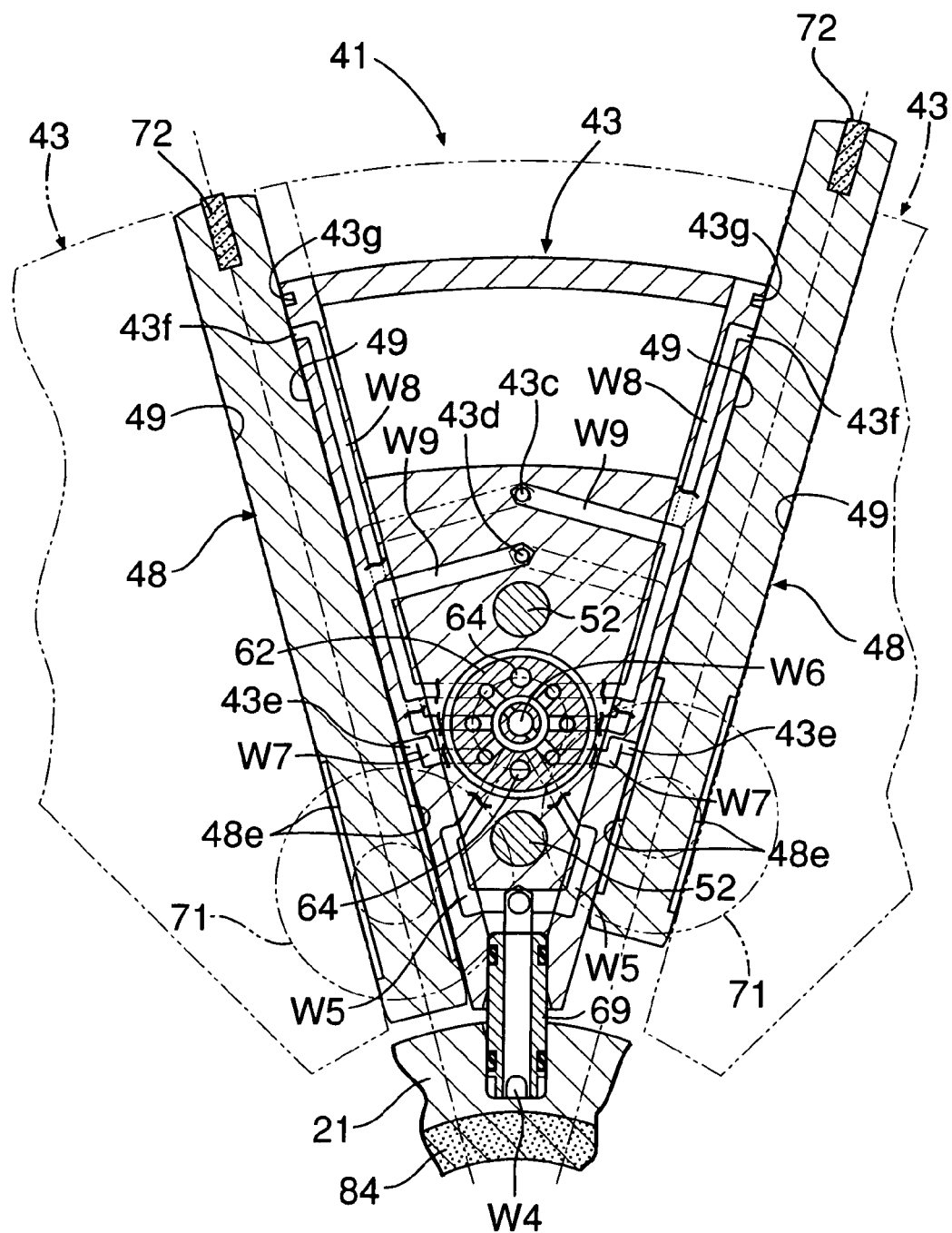
Figure 12:
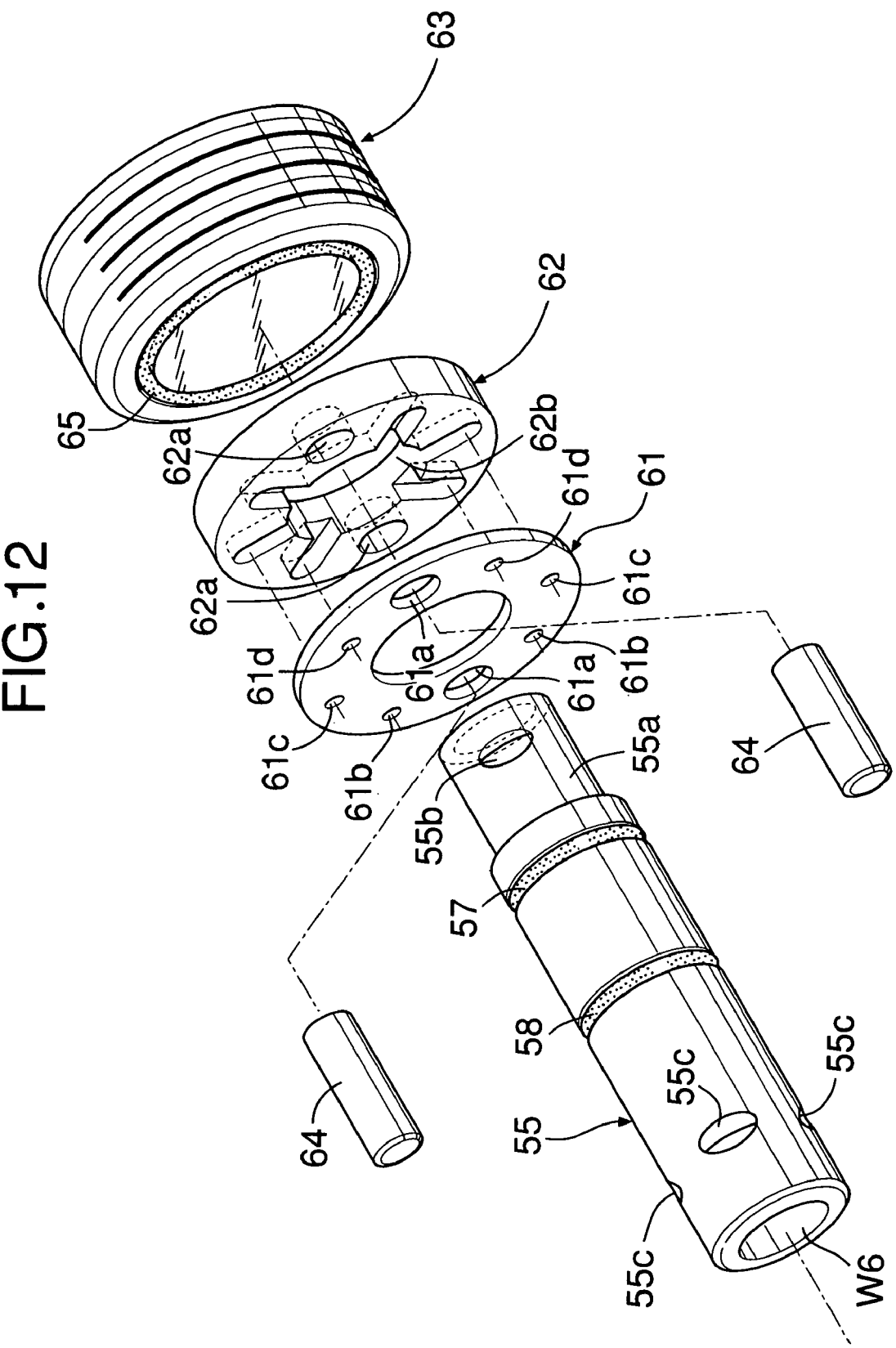

As is clear from FIG. 8, FIG. 9, and FIG. 12, a through hole 53 running through the rotor segment 43 and the rotor core 42 is formed between the two knock pin holes 51, and recesses 54 are formed at opposite ends of the through hole 53. Two pipe members 55 and 56 are fitted within the through hole 53 via seals 57 to 60, and an orifice-forming plate 61 and a lubricating water distribution member 62 are fitted into each of the recesses 54 and secured by a nut 63. The orifice-forming plate 61 and the lubricating water distribution member 62 are prevented from rotating relative to the rotor segments 43 by two knock pins 64 running through knock pin holes 61a of the orifice-forming plate 61 and fitted into knock pin holes 62a of the lubricating water distribution member 62, and a gap between the lubricating water distribution member 62 and the nut 63 is sealed by an O ring 65.

A small diameter portion 55a formed in an outer end portion of one of the pipe members 55 communicates with a sixth water passage W6 within the pipe member 55 via a through hole 55b, and the small diameter portion 55a also communicates with a radial distribution channel 62b formed on one side face of the lubricating water distribution member 62. The distribution channel 62b of the lubricating water distribution member 62 extends in six directions, and the extremities thereof communicate with six orifices 61b, 61c, and 61d of the orifice-forming plate 61. The structures of the orifice-forming plate 61, the lubricating water distribution member 62, and the nut 63 provided at the outer end portion of the other pipe member 56 are identical to the structures of the above-mentioned orifice-forming plate 61, lubricating water distribution member 62, and nut 63.

Downstream sides of the two orifices 61b of the orifice-forming plate 61 communicate with the two lubricating water outlets 43e, which open so as to be opposite the vane 48, via seventh water passages W7 formed within the rotor segments 43; downstream sides of the two orifices 61c communicate with the two lubricating water outlets 43f, which open so as to be opposite the vane 48, via eighth water passages W8 formed within the rotor segment 43; and downstream sides of the two orifices 61d communicate with the two lubricating water outlets 43c and 43d, which open so as to be opposite the rotor chamber 14, via ninth water passages W9 formed within the rotor segment 43.

Figure 5:
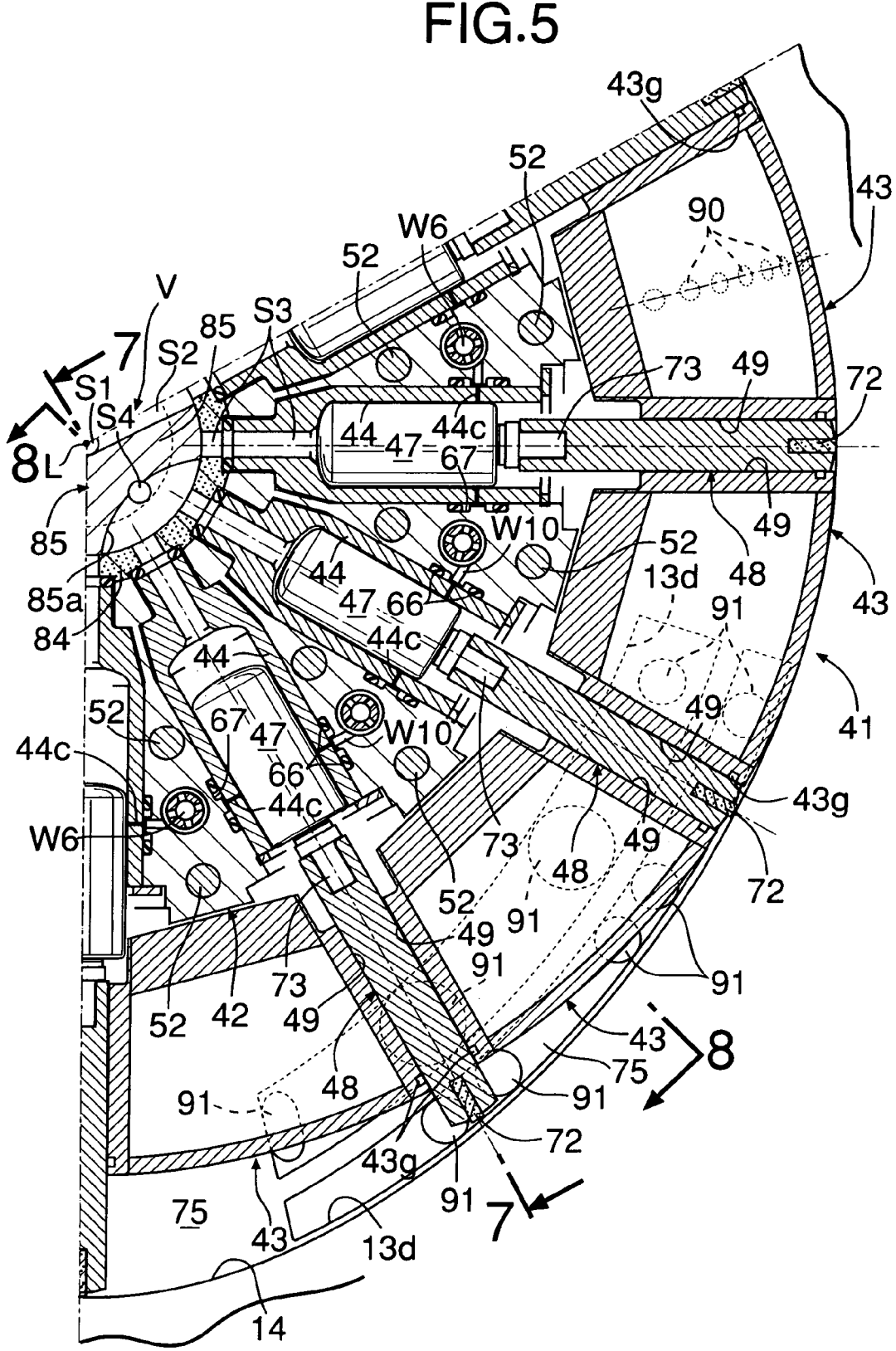
Figure 6:
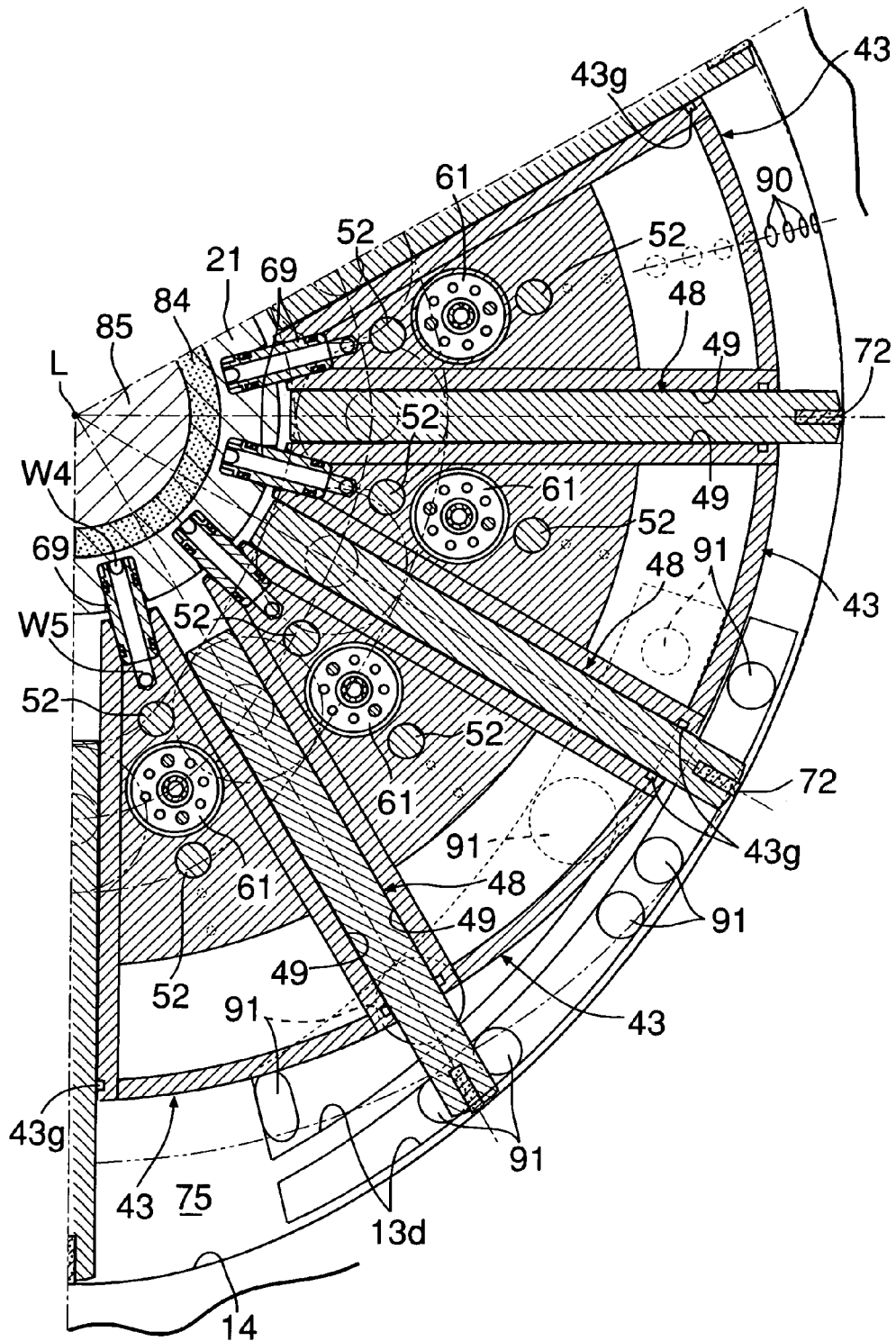

As is clear from reference in addition to FIG. 5, an annular channel 67 is defined by a pair of O rings 66 on the outer periphery of the cylinder 44, and the sixth water passage W6 formed within said one of the pipe members 55 communicates with the annular channel 67 via four through holes 55c running through the pipe member 55 and a tenth water passage W10 formed within the rotor core 42. The annular channel 67 communicates with sliding surfaces of the cylinder bore 44b and the piston 47 via an orifice 44c. The position of the orifice 44c of the cylinder 44 is set so that it stays within the sliding surface of the piston 47 when the piston 47 moves between top dead center and bottom dead center.

As is clear from FIG. 3 and FIG. 9, the first water passage W1 formed in the lubricating water supply member 24 communicates with the small diameter portion 55a of said one of the pipe members 55 via a second water passage W2 formed in the seal block 25, third water passages W3 formed in the small diameter portion 21b of the rotating shaft 21, an annular channel 68a formed in the outer periphery of a water passage forming member 68 fitted in the center of the rotating shaft 21, a fourth water passage W4 formed in the rotating shaft 21, a pipe member 69 bridging the rotor core 42 and the rotor segments 43, and fifth water passages W5 formed so as to bypass the knock pin 52 on the radially inner side of the rotor segment 43.

Figure 7:
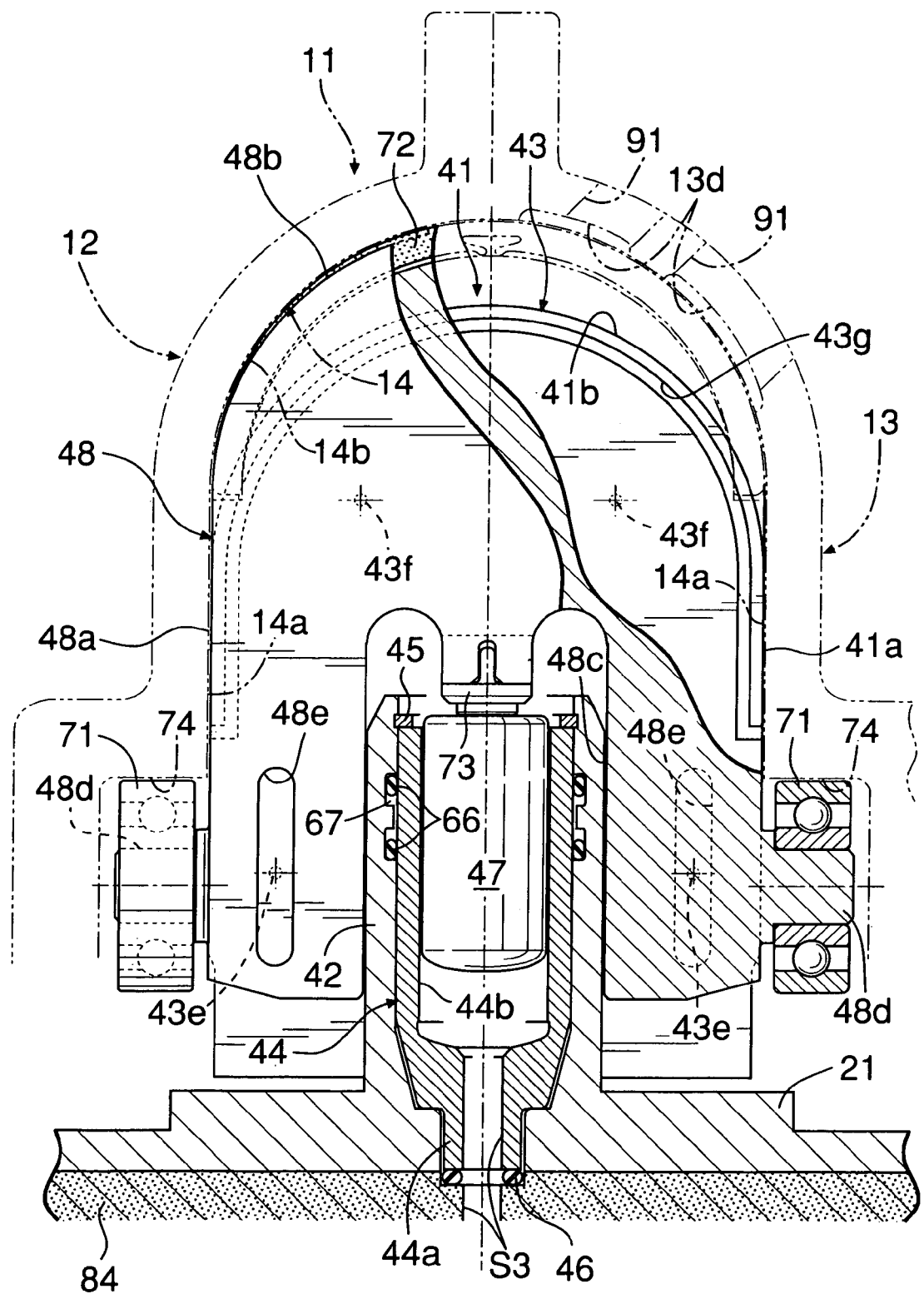
Figure 11:
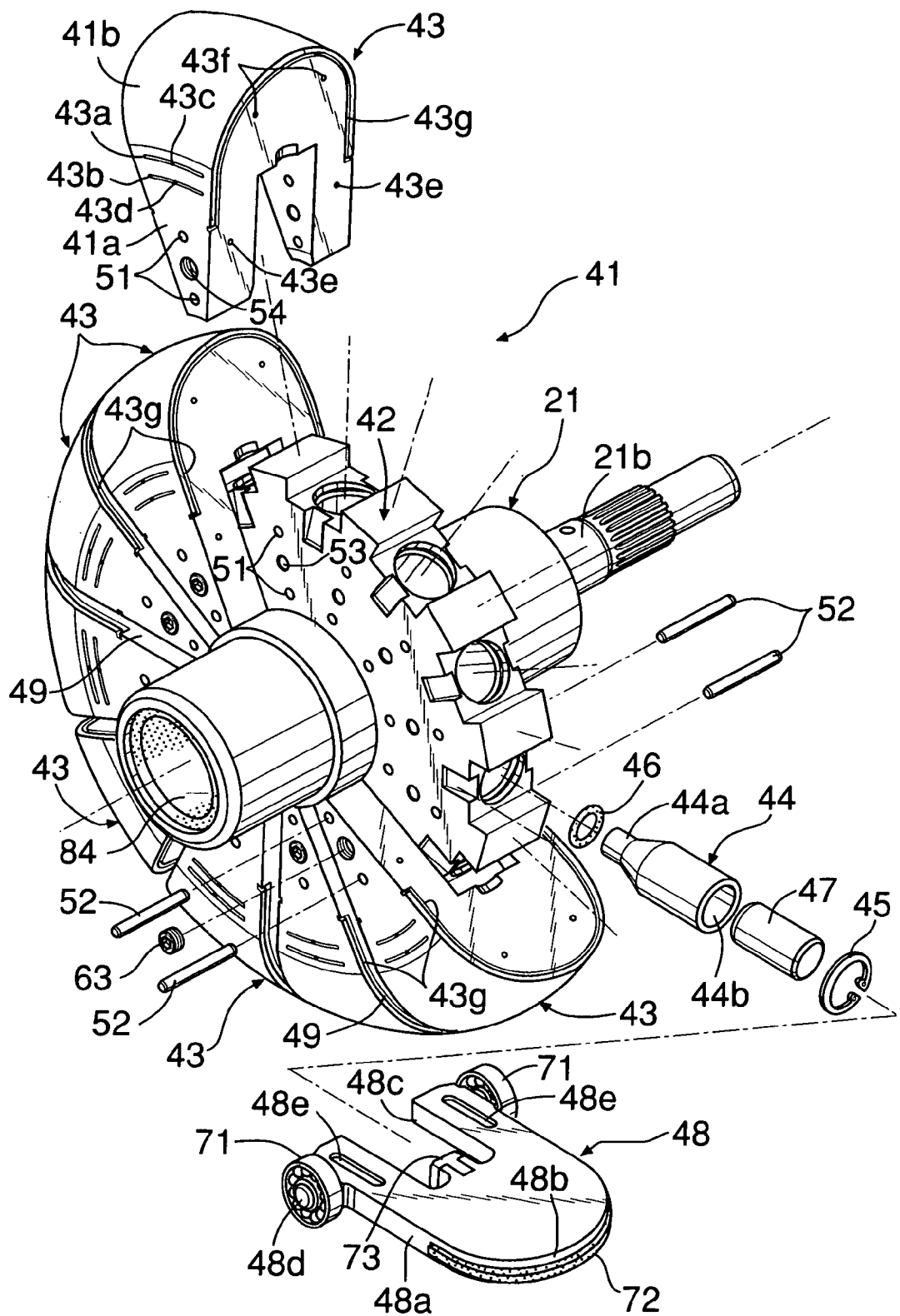

As shown in FIG. 7, FIG. 9, and FIG. 11, twelve vane channels 49 are formed between adjacent rotor segments 43 of the rotor 41 so as to extend in the radial direction, and the plate-shaped vanes 48 are slidably fitted in the respective vane channels 49. Each of the vanes 48 has a substantially U-shaped form comprising parallel faces 48a following the parallel faces 14a of the rotor chamber 14, an arc-shaped face 48b following the arc-shaped face 14b of the rotor chamber 14, and a notch 48c positioned between the parallel faces 48a. Rollers 71 having a roller bearing structure are rotatably supported on a pair of support shafts 48d projecting from the parallel faces 48a.

A U-shaped synthetic resin seal 72 is retained in the arc-shaped face 48b of the vane 48, and the extremity of the seal 72 projects slightly from the arc-shaped face 48b of the vane 48 and comes into sliding contact with the arc-shaped face 14b of the rotor chamber 14. Two recesses 48e are formed on each side of the vane 48, and these recesses 48e are opposite the two radially inner lubricating water outlets 43e that open on the end faces of the rotor segment 43. A piston receiving member 73, which is provided so as to project radially inward in the middle of the notch 48c of the vane 48, abuts against the radially outer end of the piston 47.

As is clear from FIG. 4, two pseudo-elliptical annular channels 74 having a similar shape to that of a rhombus with its four apexes rounded are provided in the flat faces 14a of the rotor chamber 14 defined by the first and second casing halves 12 and 13, and the pair of rollers 71 of each of the vanes 48 are rollably engaged with these annular channels 74. The distance between these annular channels 74 and the arc-shaped face 14b of the rotor chamber 14 is constant throughout the whole circumference. Therefore, when the rotor 41 rotates, the vane 48 having the rollers 71 guided by the annular channels 74 reciprocates radially within the vane channel 49, and the seal 72 mounted on the arc-shaped face 48b of the vane 48 slides along the arc-shaped face 14b of the rotor chamber 14 with a constant amount of compression. This enables direct physical contact between the rotor chamber 14 and the vanes 48 to be prevented and vane chambers 75 defined between adjacent vanes 48 to be reliably sealed while preventing any increase in the sliding resistance or the occurrence of wear.

As is clear from FIG. 2, a pair of circular seal channels 76 are formed in the flat faces 14a of the rotor chamber 14 so as to surround the outside of the annular channels 74. A pair of ring seals 79 equipped with two O rings 77 and 78 are slidably fitted in the circular seal channels 76, and the seal surfaces are opposite the recesses 43a and 43b (see FIG. 4) formed in each of the rotor segments 43. The pair of ring seals 79 are prevented from rotating relative to the first and second casing halves 12 and 13 by knock pins 80.

Figure 10:
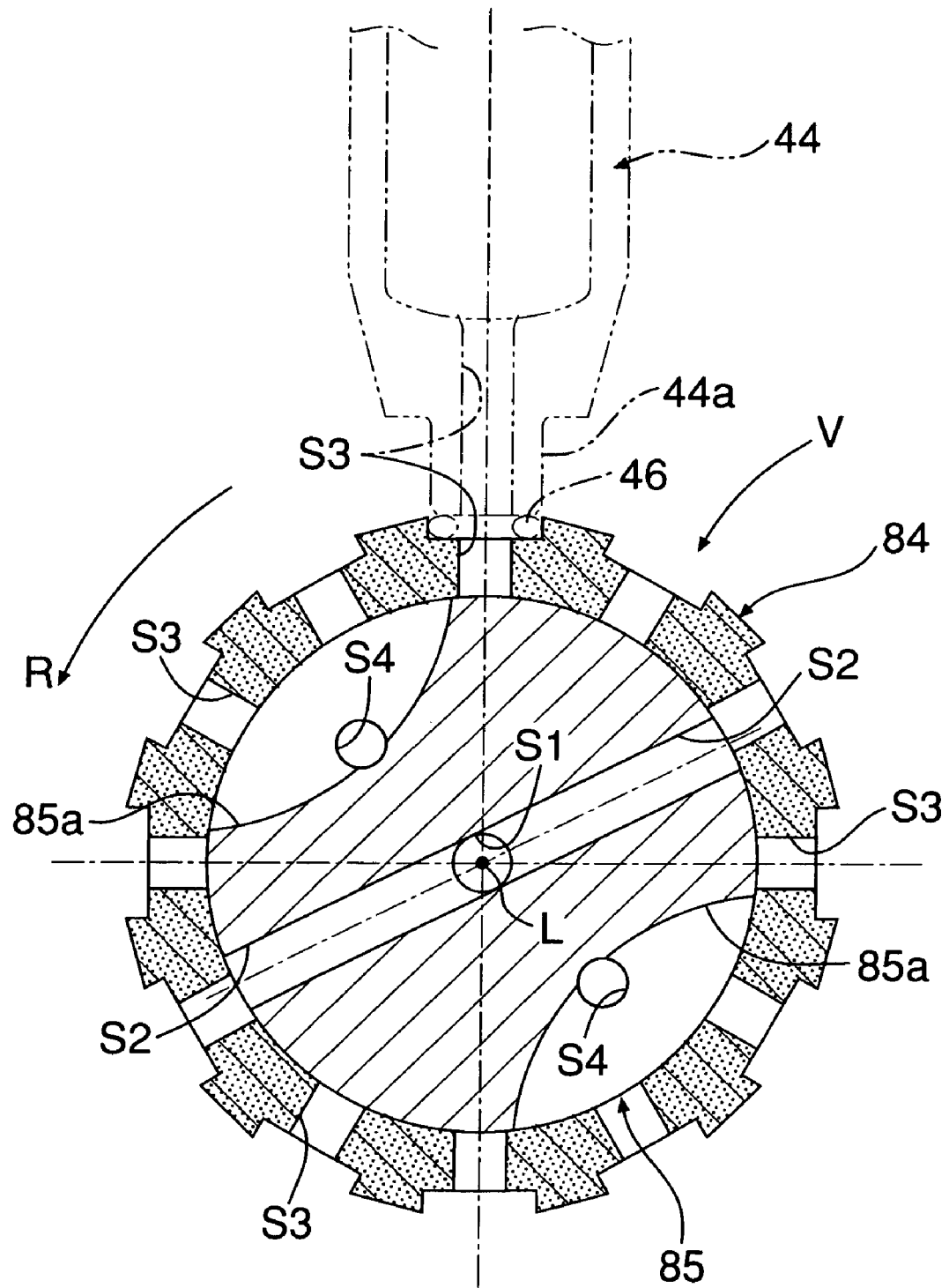

As is clear from FIG. 2, FIG. 3, and FIG. 10, an opening 16b is formed at the center of the transit chamber outer wall 16; a boss portion 81a of a fixed shaft support member 81 disposed on the axis L is secured to the inner face of the opening 16b by a plurality of bolts 82, and secured to the first casing half 12 by means of a nut 83. A cylinder-shaped ceramic sleeve 84 is fixed to the hollow portion 21a of the rotating shaft 21. The outer peripheral face of the fixed shaft 85, which is integral with the fixed shaft support member 81, is relatively rotatably fitted within the inner peripheral face of this sleeve 84. A gap between the left-hand end of the fixed shaft 85 and the first casing half 12 is sealed by a seal 86, and a gap between the right-hand end of the fixed shaft 85 and the rotating shaft 21 is sealed by a seal 87.

A steam supply pipe 88 is fitted into the fixed shaft support member 81, which is disposed on the axis L, and is secured by a nut 89, and the right-hand end of the steam supply pipe 88 is press-fitted into the center of the fixed shaft 85. The first steam passage S1, which communicates with the steam supply pipe 88, is formed in the center of the fixed shaft 85 in the axial direction, and the pair of second steam passages S2 run radially through the fixed shaft 85 with a phase difference of 180°. As described above, the twelve third steam passages S3 run through the sleeve 84 and the small diameter portions 44a of the twelve cylinders 44 retained at intervals of 30° in the rotor 41 fixed to the rotating shaft 21, and radially inner end portions of these third steam passages S3 are opposite the radially outer end portions of the second steam passages S2 so as to be able to communicate therewith.

A pair of notches 85a are formed on the outer peripheral face of the fixed shaft 85 with a phase difference of 180°, and these notches 85a can communicate with the third steam passages S3. The notches 85a and the transit chamber 19 communicate with each other via a pair of fourth steam passages S4 formed axially in the fixed shaft 85, a fifth annular steam passage S5 formed axially in the fixed shaft support member 81, and through holes 81b opening on the outer periphery of the boss portion 81a of the fixed shaft support member 81.

As shown in FIG. 2 and FIG. 4, a plurality of radially aligned intake ports 90 are formed in the first casing half 12 and the second casing half 13 at positions that are advanced by 15° in the direction of rotation R of the rotor 41 relative to the minor axis of the rotor chamber 14. The interior space of the rotor chamber 14 communicates with the transit chamber 19 by means of these intake ports 90. Furthermore, a plurality of exhaust ports 91 are formed in the second casing half 13 at positions that are retarded by 15° to 75° in the direction of rotation R of the rotor 41 relative to the minor axis of the rotor chamber 14. The interior space of the rotor chamber 14 communicates with the exhaust chamber 20 by means of these exhaust ports 91. These exhaust ports 91 open in shallow depressions 13d formed within the second casing half 13 so that the seals 72 of the vanes 48 are not damaged by the edges of the exhaust ports 91.

The second steam passages S2 and the third steam passages S3, and the notches 85a of the fixed shaft 85 and the third steam passages S3, form a rotary valve V, which provides periodic communication therebetween by rotation of the rotating shaft 21 relative to the fixed shaft 85 (see FIG. 10).

As is clear from FIG. 2, pressure chambers 92 are formed at the rear face of the ring seals 79 fitted in the circular seal channels 76 of the first and second casing halves 12 and 13. An eleventh water passage W11 formed in the first and second casing halves 12 and 13 communicates with the two pressure chambers 92 via a twelfth water passage W12 and a thirteenth water passage W13, which are formed from pipes, and the ring seals 79 are urged toward the side face of the rotor 41 by virtue of water pressure applied to the two pressure chambers 92.

The eleventh water passage W11 communicates with the outer peripheral face of the annular filter 30 via a fourteenth water passage W14, which is a pipe, and the inner peripheral face of the filter 30 communicates with a sixteenth water passage W16 formed in the second casing half 13 via a fifteenth water passage W15 formed in the second casing half 13. Water supplied to the sixteenth water passage W16 lubricates sliding surfaces of the fixed shaft 85 and the sleeve 84. Water supplied to the outer periphery of the bearing member 23 from the inner peripheral face of the filter 30 via a seventeenth water passage W17 lubricates the outer peripheral face of the rotating shaft 21 through an orifice penetrating the bearing members 23. On the other hand, water supplied to the outer periphery of the bearing members 22 from the eleventh water passage W11 via an eighteenth water passage W18, which is a pipe, lubricates the outer peripheral face of the rotating shaft 21 through an orifice penetrating the bearing member 22, and then lubricates the sliding surfaces between the fixed shaft 85 and the sleeve 84.

Operation of the present embodiment having the above-mentioned arrangement is now explained.

Operation of the expander 4 is first explained. In FIG. 3, high temperature, high pressure steam from the evaporator 3 is supplied to the steam supply pipe 88, the first steam passage S1 passing through the center of the fixed shaft 85, and the pair of second steam passages S2 passing radially through the fixed shaft 85. In FIG. 10, when the sleeve 84 that rotates integrally with the rotor 41 and the rotating shaft 21 in the direction shown by the arrow R reaches a predetermined phase relative to the fixed shaft 85, the pair of third steam passages S3 that are present on the advanced side in the direction of rotation R of the rotor 41 relative to the position of the minor axis of the rotor chamber 14 are made to communicate with the pair of second steam passages S2, and the high temperature, high pressure steam of the second steam passages S2 is supplied to the interiors of a pair of the cylinders 44 via the third steam passages S3 and pushes the pistons 47 radially outward. In FIG. 4, when the vanes 48 pushed by the pistons 47 move radially outward, since the pair of rollers 71 provided on the vanes 48 are engaged with the annular channels 74, the forward movement of the pistons 47 is converted into rotational movement of the rotor 41.

Even after the communication between the second steam passages S2 and the third steam passages S3 is blocked as a result of the rotation of the rotor 41, the high temperature, high pressure steam within the cylinders 44 continues to expand, thus making the pistons 47 move further forward and thereby enabling the rotor 41 to continue to rotate. When the vanes 48 reach the position of the major axis of the rotor chamber 14, the third steam passages S3 communicating with the corresponding cylinders 44 also communicate with the notches 85a of the fixed shaft 85, the pistons 47 are pushed by the vanes 48 whose rollers 71 are guided by the annular channels 74 and move radially inward, and the steam within the cylinders 44 accordingly passes through the third steam passages S3, the notches 85a, the fourth passages S4, the fifth passage S5, and the through holes 81b, and is supplied to the transit chamber 19 as a first decreased temperature, decreased pressure steam. The first decreased temperature, decreased pressure steam is the high temperature, high pressure steam that has been supplied from the steam supply pipe 88, has finished the work of driving the pistons 47 and, as a result, has a decreased temperature and pressure. The thermal energy and the pressure energy of the first decreased temperature, decreased pressure steam are lower than those of the high temperature, high pressure steam, but are still sufficient for driving the vanes 48.

The first decreased temperature, decreased pressure steam within the transit chamber 19 is supplied to the vane chambers 75 within the rotor chamber 14 via the intake ports 90 of the first and second casing halves 12 and 13, and further expands therein to push the vanes 48, thus rotating the rotor 41. A second decreased temperature, decreased pressure steam that has finished work and accordingly has a further decreased temperature and pressure is discharged from the exhaust ports 91 of the second casing half 13 into the exhaust chamber 20, and is supplied therefrom to the condenser 5.

In this way, the expansion of the high temperature, high pressure steam enables the twelve pistons 47 to operate in turn to rotate the rotor 41 via the rollers 71 and the annular channels 74, and the expansion of the first decreased temperature, decreased pressure steam, which is the high temperature, high pressure steam whose temperature and pressure have decreased, enables the rotor 41 to rotate via the vanes 48, thereby providing an output from the rotating shaft 21.

Lubrication of the vanes 48 and the pistons 47 of the expander 4 with water is now explained.

Supply of lubricating water is carried out by utilizing the supply pump 6 (see FIG. 1) for supplying under pressure water from the condenser 5 to the evaporator 3, and a portion of the water discharged from the supply pump 6 is supplied to the first water passage W1 of the casing 11 for lubrication. Utilizing the supply pump 6 in this way for supplying water for hydrostatic bearings of each section of the expander 4 eliminates the need for a special pump and enables the number of components to be reduced.

In FIG. 3 and FIG. 8, the water that has been supplied to the first water passage W1 of the lubricating water supply member 24 flows into the small diameter portion 55*a* of one of the pipe members 55 via the second water passages W2 of the seal block 25, the third water passages W3 of the rotating shaft 21, the annular channel 68*a* of the water passage forming member 68, the fourth water passage W4 of the rotating shaft 21, and the fifth water passages. W5 formed in the pipe member 69 and the rotor segment 43, and the water that has flowed into the small diameter portion 55*a* flows into the small diameter portion 56*a* of the other pipe member 56 via the through hole 55*b* of said one of the pipe members 55, the sixth water passage W6 formed in the pipe members 55 and 56, and the through hole 56*b* formed in the other pipe member 56.

A portion of the water that has passed through the six orifices 61*b*, 61*c*, and 61*d* of the orifice-forming plate 61 from the small diameter portions 55*a* and 56*a* of the pipe members 55 and 56 via the distribution channel 62*b* of the lubricating water distribution member 62 issues from the four lubricating water outlets 43*e* and 43*f* that open on the end faces of the rotor segment 43, and another portion of the water issues from the lubricating water outlets 43*c* and 43*d* within the arc-shaped recesses 43*a* and 43*b* formed on the side faces of the rotor segment 43.

In this way, the water issuing from the lubricating water outlets 43*e* and 43*f* on the end faces of each of the rotor segments 43 into the vane channel 49 supports the vane 48 in a floating state by forming a hydrostatic bearing between the vane channel 49 and the vane 48, which is slidably fitted in the vane channel 49, thus preventing physical contact between the end face of the rotor segment 43 and the vane 48 and thereby preventing the occurrence of seizing and wear. Supplying the water for lubricating the sliding surfaces of the vane 48 via the water passages provided in a radial shape within the rotor 41 in this way not only enables the water to be pressurized by virtue of centrifugal force but also enables the temperature of the periphery of the rotor 41 to be stabilized, thus lessening the effect of thermal expansion and thereby minimizing the leakage of steam by maintaining a preset clearance.

Since water is retained in the recesses 48*e*, two of which are formed on each of the opposite faces of the vane 48, these recesses 48*e* function as pressure reservoirs, thereby suppressing any decrease in pressure due to leakage of water. As a result the vane 48, which is held between the end faces of the pair of rotor segments 43, is in a floating state due to the water, and the sliding resistance can thereby be reduced effectively. Furthermore, when the vane 48 reciprocates, the radial position of the vane 48 relative to the rotor 41 changes, and since the recesses 48*e* are provided not on the rotor segment 43 side but on the vane 48 side and in the vicinity of the rollers 71, where the largest load is imposed on the vane 48, the reciprocating vane 48 can always be kept in a floating state, and the sliding resistance can thereby be reduced effectively.

Water that has lubricated sliding surfaces of the vane 48 and the end face of the rotor segment 43 moves radially outward by virtue of centrifugal force, and the majority thereof is captured by the U-shaped lubricating water guide channel 43*g* formed in the rotor segment 43 and then discharged into the annular channels 74, which are at low pressure and with which the opposite end portions of the lubricating water guide channel 43*g* communicate. Only the portion of water that has passed the lubricating water guide channel 43*g* without being captured lubricates sliding surfaces of the arc-shaped face 14*b* of the rotor chamber 14 and the seal 72 provided on the arc-shaped face 48*b* of the vane 48. Water that has finished lubrication is discharged from the rotor chamber 14 via the exhaust ports 91.

In this way, since the lubricating water guide channel 43*g* prevents a large amount of the water used for the hydrostatic bearing that supports the vane 48 in a floating state from entering the rotor chamber 14, it is possible to prevent effectively this water from cooling the steam within the vane chambers 75 defined within the rotor chamber 14 and the output of the expander 4 from being degraded. Moreover, since the water captured by the lubricating water guide channel 43*g* is discharged into the annular channels 74, it is possible to more reliably prevent the water from entering the vane chambers 75.

In FIG. 2, by supplying water into the pressure chambers 92 at the bottom portions of the circular seal channels 76 of the first casing half 12 and the second casing half 13 so as to urge the ring seals 79 toward the side faces of the rotor 41, and making the water issue from the lubricating water outlets 43*c* and 43*d* formed within the recesses 43*a* and 43*b* of each of the rotor segments 43 so as to form a hydrostatic bearing on the sliding surfaces with the flat faces 14*a* of the rotor chamber 14, the flat faces 41*a* of the rotor 41 can be sealed by the ring seals 79 that are in a floating state within the circular seal channels 76 and, as a result, the steam within the rotor chamber 14 can be prevented from leaking through a gap with the rotor 41. In this process, the ring seals 79 and the rotor 41 are isolated from each other by a film of water supplied from the lubricating water outlets 43c and 43d and do not make physical contact with each other, and even if the rotor 41 tilts, tilting of the ring seals 79 within the circular seal channels 76 so as to track the tilting of the rotor 41 enables stable sealing characteristics to be maintained while minimizing the frictional force.

The water that has lubricated the sliding section between the ring seals 79 and the rotor 41 is supplied to the rotor chamber 14 by virtue of centrifugal force, and discharged therefrom to the exterior of the casing 11 via the exhaust ports 91.

Furthermore, in FIG. 5, water that has been supplied from the sixth water passage W6 within the pipe member 55 to the sliding surfaces between the cylinder 44 and the piston 47 via the tenth water passage W10 within the rotor segments 43 and the annular channel 67 of the outer periphery of the cylinder 44 exhibits a sealing function by virtue of the viscous properties of the film of water formed on the sliding surfaces, thereby preventing effectively the high temperature, high pressure steam supplied to the cylinder 44 from leaking past the sliding surfaces with the piston 47. Since the water that is supplied to the sliding surfaces between the cylinder 44 and the piston 47 through the interior of the expander 4, which is in a high temperature state, is heated, it is possible to minimize any decrease in output of the expander 4 that might be caused by this water cooling the high temperature, high pressure steam supplied to the cylinder 44.

Furthermore, the first water passage W1 and the eleventh water passage W11 are independent from each other, and water is supplied at a pressure that is required for each of the lubrication sections. More specifically, the water that is supplied from the first water passage W1 is mainly for floatingly supporting the vanes 48 and the rotor 41 by means of a hydrostatic bearing as described above, and it is required to have a high pressure that can counterbalance variations in the load. In contrast, the water that is supplied from the eleventh water passage W11 mainly lubricates the surroundings of the fixed shaft 85, and since it is for sealing the high temperature, high pressure steam that leaks from the third steam passages S3 past the outer periphery of the fixed shaft 85 so as to reduce the influence of thermal expansion of the fixed shaft 85, the rotating shaft 21, the rotor 41, etc., it is only required to have a pressure that is at least higher than the pressure of the transit chamber 19.

Since there are provided in this way two water supply lines, that is, the first water passage W1 for supplying high pressure water and the eleventh water passage W11 for supplying lower pressure water, problems caused when only one water supply line for supplying high pressure water is provided can be eliminated. That is, the problem of water having excess pressure being supplied to the surroundings of the fixed shaft 85, thus increasing the amount of water flowing into the transit chamber 19, and the problem of the fixed shaft 85, the rotating shaft 21, the rotor 41, etc. being overcooled, thus decreasing the temperature of the steam, can be prevented, and as a result the output of the expander 4 can be increased while reducing the amount of water supplied.

Moreover, since water, which is the same substance as steam, is used as a medium for sealing, there will be no problem even if the steam is contaminated with water. If the sliding surfaces of the cylinder 44 and the piston 47 were sealed by an oil, since it would be impossible to prevent the oil from contaminating the water or the steam, a special filter device for separating the oil would be required. Furthermore, since a portion of the water for lubricating the sliding surfaces of the vane 48 and the vane channels 49 is separated for sealing the sliding surfaces of the cylinder 44 and the piston 47, it is unnecessary to specially provide an extra water passage for guiding the water to the sliding surfaces, thus simplifying the structure.

Other than the embodiment described above, as an arrangement for a power conversion device for converting the forward movement of pistons 47 into the rotational movement of a rotor 41, the forward movement of the pistons 47 can be directly transmitted to rollers 71 without involving vanes 48, and can be converted into rotational movement by engagement with annular channels 74. Furthermore, as long as the vanes 48 are always spaced from the inner peripheral face of a rotor chamber 14 by a substantially constant gap as a result of cooperation between the rollers 71 and the annular channels 74 as described above, the pistons 47 and the rollers 71, and also the vanes 48 and the rollers 71, can independently work together with the annular channels 74.

When the expander 4 is used as a compressor, the rotor 41 is rotated by the rotating shaft 21 in a direction opposite to the arrow R in FIG. 4, outside air is drawn in by the vanes 48 from the exhaust ports 91 into the rotor chamber 14 and compressed, and the low pressure compressed air thus obtained is drawn in from the intake ports 90 into the cylinders 44 via the transit chamber 19, the through holes 81b, the fifth steam passages S5, the fourth steam passages S4, the notches 85a of the fixed shaft 85 and the third steam passages S3, and compressed there by the pistons 47 to give high pressure compressed air. The high pressure compressed air thus obtained is discharged from the cylinders 44 via the third steam passages S3, the second steam passages S2, the first steam passage S1, and the steam supply pipe 88. When the expander 4 is used as a compressor, the steam passages S1 to S5 and the steam supply pipe 88 are read instead as air passages S1 to S5 and air supply pipe 88.

Although an embodiment of the present invention is described in detail above, the present invention can be modified in a variety of ways without departing from the scope and spirit thereof.

For example, in the embodiment, the expander 4 is illustrated as the rotary fluid machine, but the present invention can also be applied to a compressor.

Furthermore, in the embodiment, steam and water are used as the gas-phase working medium and the liquid-phase working medium, but other appropriate working media can also be employed.

Moreover, in the embodiment, water captured by the lubricating water guide channel 43g is discharged into the annular channels 74, but it can be discharged into another appropriate space.

INDUSTRIAL APPLICABILITY

The present invention can desirably be applied to an expander employing steam (water) as a working medium, but can also be applied to an expander employing any other working medium and a compressor employing any working medium.

What is claimed is:

1. A rotary fluid machine comprising a rotor chamber (14) formed in a casing (11), a rotor (41) rotatably housed within the rotor chamber (14), a plurality of vane channels (49) formed radially in the rotor (41), and a plurality of vanes (48) slidably supported in the respective vane channels (49);

the vanes (48) being supported in a floating state by a hydrostatic bearing formed by supplying a liquid-phase working medium to sliding surfaces of the vane channels (49) and the vanes (48), and the rotary fluid machine interconverting the rotational energy of the rotor (41) and the pressure energy of a gas-phase working medium supplied to vane chambers (75) defined by the rotor (41), the casing (11), and the vanes (48);

wherein a liquid-phase working medium guide channel (43g) is formed in the vane channels (49) of the rotor (41) so as to surround a part of the hydrostatic bearing, and the liquid-phase working medium supplied to the hydrostatic bearing is captured by the liquid-phase working medium guide channel (43g) so as to prevent the liquid-phase working medium from flowing into the vane chambers (75).

2. The rotary fluid machine according to claim 1, wherein an end portion of the liquid-phase working medium guide channel (43g) opens within a space other than the vane chambers (75).

* * * * *